R. W. FUNK.
TOOL FOR OPERATING VEHICLE WHEEL RIMS.
APPLICATION FILED JAN. 15, 1912.

1,146,421.

Patented July 13, 1915.
2 SHEETS—SHEET 1.

WITNESSES
H. Crocheron
Gerald E. Terwilliger

INVENTOR
Richard W. Funk
BY Seward Davis
ATTORNEY

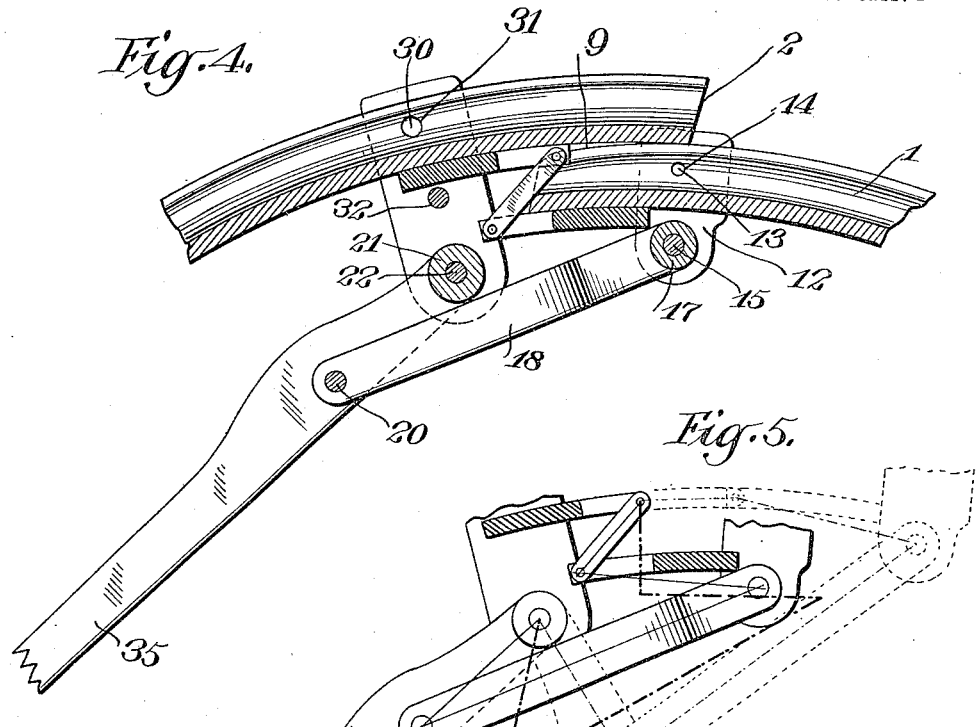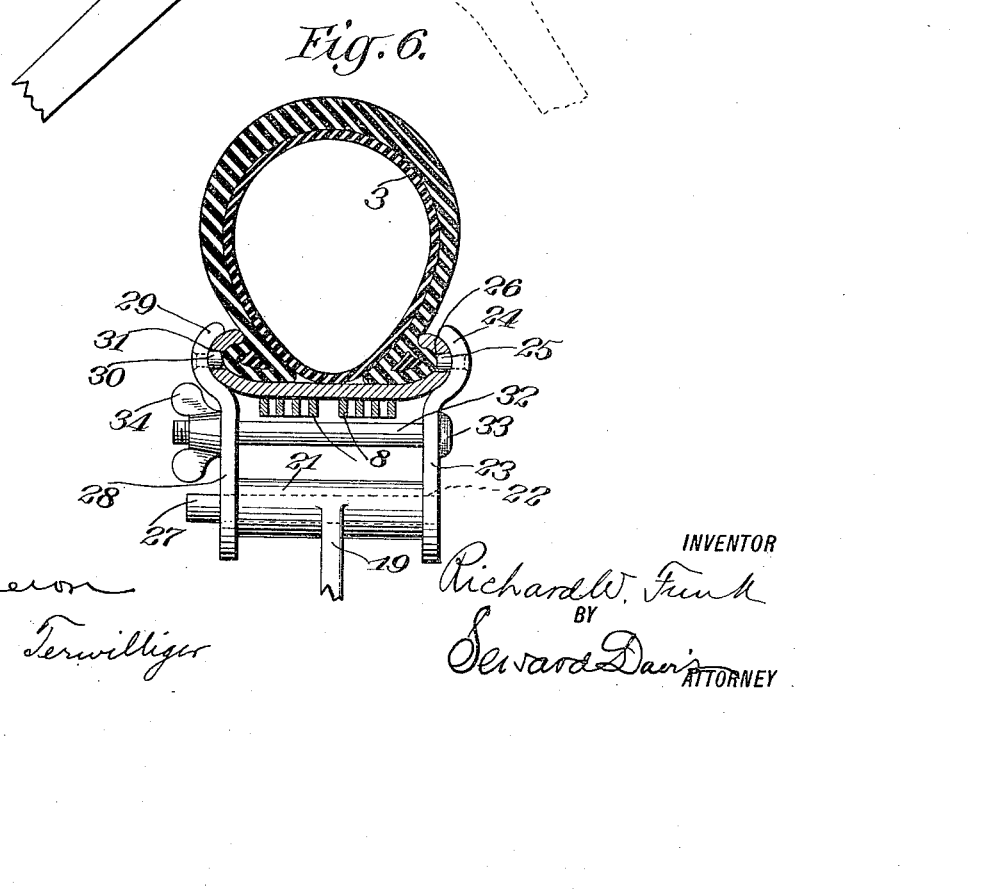

UNITED STATES PATENT OFFICE.

RICHARD W. FUNK, OF WEEHAWKEN, NEW JERSEY, ASSIGNOR TO R. W. FUNK, INCORPORATED, OF NEW YORK, N. Y., A CORPORATION OF NEW YORK.

TOOL FOR OPERATING VEHICLE WHEEL-RIMS.

1,146,421.   Specification of Letters Patent.   Patented July 13, 1915.

Application filed January 15, 1912. Serial No. 671,169.

*To all whom it may concern:*

Be it known that I, RICHARD W. FUNK, a citizen of the United States, residing in the city of Weehawken, county of Hudson, and State of New Jersey, have invented certain new and useful Improvements in Tools for Operating Vehicle Wheel-Rims, of which the following is a specification.

My invention relates to a device for effecting the collapse and subsequent re-alinement of a tire-carrying rim of a form commonly used for automobile service and the like, in which the resilient tire is carried upon a transversely split rim which is detachably secured to the felly of the wheel.

My improved device comprises a tool having members which engage the rim on either side of the split therein. The movement through a comparatively small arc of a lever forming part of the mechanism acts first to displace the abutting ends of the rim along the line of cleavage, then by its further movement to cause the ends of the rim to slide past one another and thereby contract the diameter of the rim, permitting the tire mounted thereon to be readily removed.

The tool is so proportioned and designed that the first movement of the lever produces a resultant force which acts along the line of cleavage. This resultant force automatically changes in direction so as to cause the rim ends to slide past each other once they are in position to move in that direction, and when finally the rim reaches the collapsed condition the resultant force tends through its action upon the tool to hold the rim in its collapsed state without the application of external force.

My improved device is therefore highly efficient in operation, quick-acting and self-locking. It has the further advantage of being simple and readily attached to any existing rim of the type indicated.

Figure 1:
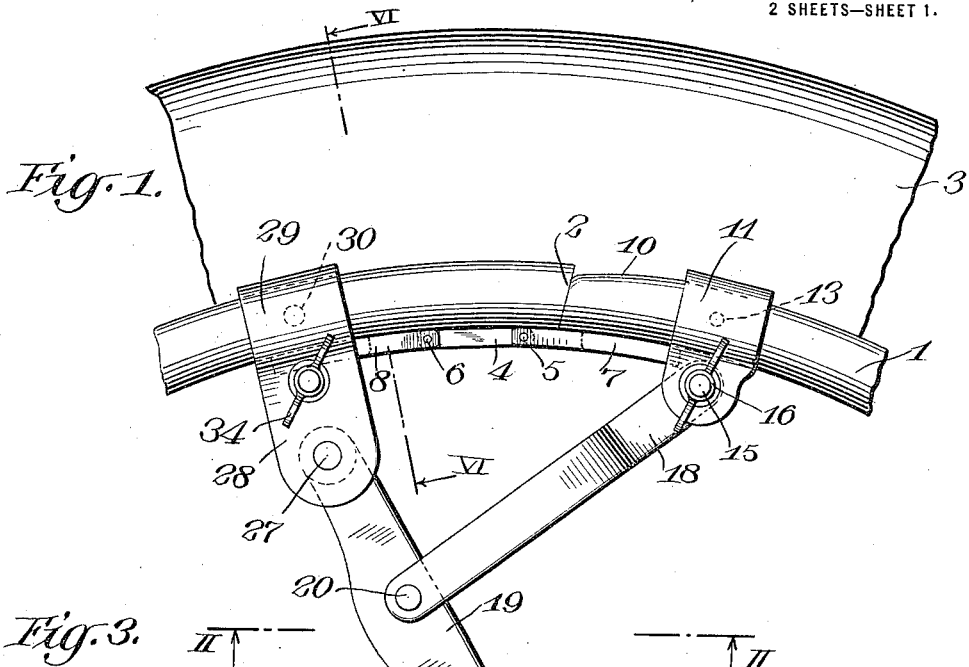
Figure 3:
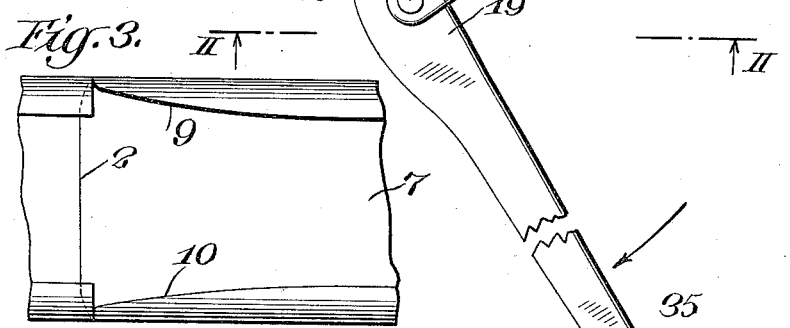
Figure 2:
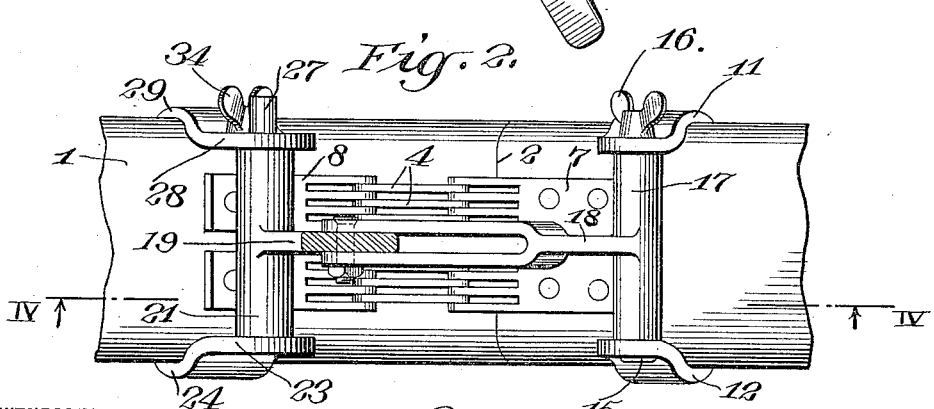

In the accompanying drawings which form a part of this specification, Figure 1 is a side elevation of a portion of a tire-carrying rim and tire with the tool attached; Fig. 2 is a view on line II—II of Fig. 1; Fig. 3 is a fragmentary top view of an improved type of rim with which this tool is most adapted to be used; Fig. 4 is a transverse sectional view on line IV—IV of Fig. 2; Fig. 5 is a diagrammatic view similar to Fig. 4 showing successive positions of the mechanism in the course of its operation; Fig. 6 is a transverse sectional view on line VI—VI of Fig. 1.

Referring now in detail to the drawings, the numeral 1 designates a detachable vehicle wheel rim transversely split at 2 on a line which is preferably inclined at a small angle to a radius, from eight to ten degrees having been found in practice a satisfactory angular deviation. Mounted upon the rim in any convenient and usual manner is a resilient tire 3. The adjacent ends of the rim are shown connected by links 4 pivoted at 5 and 6, respectively, to straps 7 and 8 riveted or otherwise secured to the inner periphery of the rim. One end of the rim adjacent to the split therein preferably has the clench tapered at 9 and 10, as shown in Fig. 3. This taper lies on the side of the rim which is adapted to be first drawn radially inward, and its purpose will later be indicated.

The tool comprises a multiple part yoke member formed of two grip sections or clips 11 and 12 curved to conform to the outer surface of the clench of the rim and having the inwardly projecting pins 13 which enter holes 14 in the opposite clenches of the rim. The member 12 is secured to a shaft 15, to the other extremity of which is detachably secured the member 11 by means of the wing nut 16, or in any other suitable manner, the members 11, 12 and 15 forming, when in position, a yoke which embraces the rim and is firmly attached thereto. Rotatably mounted upon the shaft 15 is a barrel 17 carrying a forked arm 18 which embraces a lever 19 and is pivoted thereto at 20. The lever or link 19 terminates at one extremity in a barrel 21 rotatably mounted on a shaft 22, to one end of which is secured a clip 23, which has formed at the other end a curved portion 24 adapted to embrace the outside of the clench of the tire-carrying rim and from which extends a pin or stud 25 adapted to enter a socket 26 in the clench of the rim. Detachably carried on the projecting end 27 of the shaft 22 is a similar clip 28 having the curved portion 29 and the inwardly extending pin 30 entering a socket 31 in the rim. Means for detachably securing the clips in place comprise a bolt 32 having a head 33 engaging the clip 23 and a wing nut 34 engaging the clip 28. The other extremity of the member 19 is formed into an operating handle 35. The pins on one yoke member are preferably made of different diameter from the pins on the other yoke member, and the sockets for their reception are made of corresponding size in order to prevent the application of the tool to the rim in its reversed position. The requirement for its successful operation is obviously that the link 18 shall occupy the relative position to the inclined split in the rim shown in the drawings.

In order to apply the tool to the rim or detach it therefrom, it is only necessary to loosen the two wing nuts sufficiently to permit the pins or studs on the yoke members to slip over the curved clenches of the tire rim and into or free from their respective sockets. In applying the tool, the wing nuts are then tightened and the rim thereby clamped firmly by the yokes on either side of the split.

With the tool in place in the position shown in Fig. 1, the detaching of the rim from the tire is accomplished by moving the handle of the tool in the direction indicated by the arrow until the parts assume the relative positions shown in Fig. 4, finally resulting in the ends of the rim overlapping for a considerable distance, and thereby contracting the diameter of the rim so that the tire, even though it be provided with inextensible beads for engagement with the clenches, may readily be slipped free from the rim.

The diagram in Fig. 5 indicates three successive positions of the parts from the start to the finish of the operation of collapsing the rim. The dotted lines indicate the parts when the ends of the rim are circumferentially alined. The full lines show the position when the rim is fully collapsed, while the heavy broken line indicates the line of centers of the different parts in an intermediate position. The mode of operation can best be seen from an inspection of this diagram. It will be noted that when force is first applied to the handle of the tool in an effort to cause the collapse of the rim, the section of the rim at the right of the split, as seen in the diagram, will be urged in a direction along the center line of the link 18. There are other conditions, however, which govern the actual movement of this part of the rim. Considering that the adjacent section remains stationary at the start, as it does to all practical purposes, a portion of the right-hand section of the rim adjacent to the split must swing about the pivot 6 as a center. The first movement of the handle of the tool moreover results in the immediate creation of an opposing force or reaction due to the fact that the rim is highly elastic and the ends tend to remain circumferentially alined. There results from the two forces thus caused to act upon the rim and the reaction furnished by the link connecting the ends of the rim, a force acting substantially parallel to the plane of the split in the rim. The righthand end of the rim, as seen in Figs. 4 and 5, is thus urged in a direction substantially parallel to this plane without any considerable friction between the abutting ends of the rim, which otherwise would cause wear and destructive action upon these parts. The farther the end of the rim is distorted toward the center of the wheel, the greater becomes the opposing force offered by the flexibility of the rim itself to this distortion, but it does not increase rapidly until the top of the clench is in such a position that it is ready to clear the inner periphery of the rim. When this condition exists the angularity of the link 18 has so changed that the force offered by the operation of the tool is no longer in its original line, but less inclined to the periphery of the rim at that point and therefore adapted to cause the ends to overlap. The parts are so proportioned that the tool is not directly parallel to the rim because the apposing force offered by the resiliency of the rim structure is twofold: first, a force tending to force the rim radially outward into circumferential alinement; second, to cause the ends to meet. The resultant of the forces acting on the rim is thus substantially in line with the depressed section of the rim and acts directly to cause the ends of the rim to overlap until the parts finally assume the position shown by the full lines in Fig. 5.

When the tool assumes approximately the position shown by the heavy broken center line of the diagram, the rim itself acts automatically to cause its complete collapse without further expenditure of effort on the part of the operator. At this juncture the force tending to cause the rim to assume a position in which the ends are together is considerably less than the force which acts solely to force the displaced section radially outward. Since the handle of the tool has passed the dead center with respect to an outward force communicated through the link 18, the tool is forcibly caused to assume the position of Fig. 4, even though the ends are thereby displaced still farther from one another. In this position the tool is self-locking and there is no tendency to cause the re-alinement of the ends of the rim until considerable force is applied to the handle in the direction opposed to the arrow in Fig. 1.

When one end of the rim first starts to slide past the other, the beads of the tire, which are held under the clenches, are forced closer together by the action of the taper on the clenches of the rim adjoining the split. These tapered edges exert a wedging action upon the tire and gently but firmly cause the disengagement of the beads of the tire from the portion of the rim which is being displaced radially inward. The action at first is purely local, but more and more of the bead is disengaged as the rim section continues to move inward, and a considerable portion of the periphery is freed by the time the tool has reached its ultimate position. The remainder of the tire may then be readily removed from the rim, a new tire placed over the rim and alined therewith, whereupon the shifting of the tool to its initial position will cause a reversal of the original operation, and the clenches will take hold of the beads of the tire without further effort on the part of the operator. In applying a tire to the rim, it is to be noted that as soon as the tool passes the dead center the resiliency of the rim acts entirely to cause the re-alinement of its ends, and therefore aids the operator in restoring the rim to its operative position, just as it has previously aided in holding the rim in its collapsed position.

Although it is possible to operate such a rim as I have described without tapering the clenches on one side of the split in the rim, nevertheless, this is likely to result in cutting the fabric covering the beads of the tire, and I regard the tapering of the clenches as an important and valuable adjunct in a rim used in connection with the tool described.

While I have illustrated and described only one specific embodiment of my invention, I realize that it is capable of wide application, and I do not desire to be limited to the precise structure shown except as required by the scope of the claims.

Having thus described my invention, I claim:

1. A tool of the class described having a pair of rim gripping members, a lever pivotally projecting from one of said members, and a link pivotally connected to said lever and to the other of said members.

2. A tool for operating a transversely split tire-carrying rim having members adapted to grip the rim on either side of the split therein, a link pivoted to one member, a second link pivoted to the other member, and pivotal connection between said links.

3. A tool for operating a transversely split tire-carrying rim having members adapted to grip the rim on either side of the split therein, a link pivoted to one member, a second link pivoted to the other member, and pivotal connection between said links, the points at which the links are pivoted to the said members being substantially offset from the points at which the device is designed to grip the rim.

4. A tool for operating a transversely split tire-carrying rim having members adapted to grip the rim on either side of the split therein, a link pivoted to one member, a second link pivoted to the other member, and pivotal connection between said links, the points at which the links are pivoted to the said members being offset radially inward from the points at which the device is designed to grip the rim.

5. A tool for operating a transversely split tire-carrying rim comprising two pairs of grip members, means for detachably clamping together each pair of grip members to grip a rim on either side of the split therein, a link pivotally connected to each pair of grip members, and pivotal connection between said links.

6. A tool for operating a transversely split tire-carrying rim comprising two pairs of grip members, means for detachably clamping together each pair of grip members to embrace a section of the rim, a forked link pivotally connected to one pair of grip members, a second link pivotally connected to the other pair of grip members and pivotally held between the forks of said first-named link, and a handle upon the outer extremity of said second link.

7. A tool of the class described, comprising a pair of clamping members, a lever fulcrumed at its one end to one of said clamping members and a link pivotally connected to said lever adjacent its fulcrumed end and also engaged with the other of said clamping members.

8. A tool of the class described, comprising a pair of clamping members each comprising a pair of clamping jaws, bolts extending through the upper portions of said jaws, means in connection with said bolts to secure the jaws of each clamping member in position with respect to one another, a lever fulcrumed near one end on the bolt connecting the jaws of one of said clamping members, a linking member having pivotal connection with the bolt on the other clamping member, said link also having pivotal connection adjacent its opposite end with said lever at a point adjacent is fulcrumed end.

RICHARD W. FUNK.

Witnesses:
 GERALD E. TERWILLIGER,
 OLIVER WILLIAMS.

Copies of this patent may be obtained for five cents each, by addressing the "Commissioner of Patents, Washington, D. C."